US006015623A

United States Patent [19]

Wielstra

[11] Patent Number: 6,015,623

[45] Date of Patent: Jan. 18, 2000

[54] UTENSIL FOR PERSONAL CARE

[75] Inventor: Ytsen Wielstra, Drachten, Netherlands

[73] Assignee: U.S. Philips Corporation, New York, N.Y.

[21] Appl. No.: 08/935,589

[22] Filed: Sep. 23, 1997

[30] Foreign Application Priority Data

Sep. 24, 1996 [EP] European Pat. Off. .............. 96202659

[51] Int. Cl.[7] .............................. B25G 1/10; B32B 27/08

[52] U.S. Cl. ............................ 428/447; 30/43.6; 30/340; 30/526; 428/328; 428/450; 428/451

[58] Field of Search ............................ 30/43.6, 340, 526; 428/450, 451, 328, 447

[56] References Cited

U.S. PATENT DOCUMENTS 4,208,471 6/1980 Bresak et al. ........................... 428/447
4,308,315 12/1981 Frye ........................................ 428/331
4,615,947 10/1986 Goossens ................................ 428/412

FOREIGN PATENT DOCUMENTS 1393488 5/1975 United Kingdom .

OTHER PUBLICATIONS

"Hybrid Nanocomposite Materials—Between Inorganic Glasses and Organic Polymers", by B.M. Novak, Adv. Mater, 1993, 5, No. 6, pp. 422–433.

"New Type of Non–Crystalline Solids Between Inorganic and Organic Materials", by H. Schmidt, Journal of Non–Crystalline Solids 73 (1985) pp. 681–691.

"Organically Modified Ceramics and Their Applications", by H. Schmidt et al, Journal of Non–Crystalline Solids 121 (1990), pp. 428–435.

*Primary Examiner*—D. S. Nakarani
*Attorney, Agent, or Firm*—Ernestine C. Bartlett

[57] ABSTRACT

The invention relates to utensils for personal care, such as an electric shaver. If these utensils are provided with a coating of lacquer containing a network of a hydrolytically condensed organosilane compound, at least the surfaces provided with said coating of lacquer exhibit a good resistance to a great variety of compositions for personal care, such as shaving locations.

7 Claims, 1 Drawing Sheet

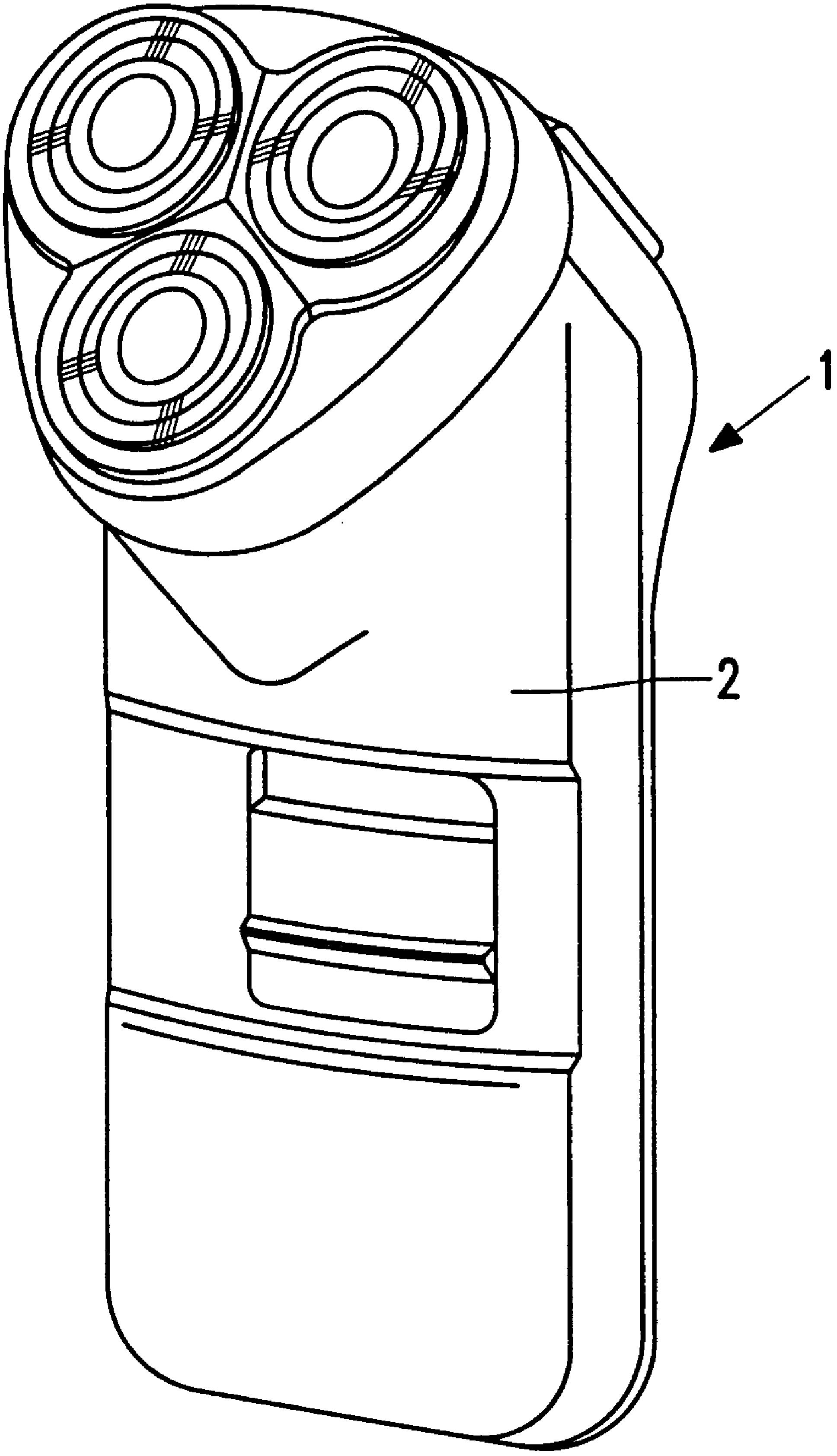
1
2

UTENSIL FOR PERSONAL CARE

BACKGROUND OF THE INVENTION

The invention relates to a utensil for personal care, which is provided with a coating of lacquer.

Utensils for personal care which are provided with a coating of lacquer are known per se. For example, the housing and/or other parts of electric shavers are often provided with a coating of lacquer, for example, of a polyurethane. During their service life, said utensils will by their nature be exposed to all kinds of compositions for personal care, such as cosmetics, lotions, shampoos and other skin-care products. The known polyurethane lacquers, also referred to as isocyanate lacquers because the starting material is cured by an isocyanate curing agent, do not only provide said utensils with an attractive appearance but also with a good resistance to acids, bases and solvents. It has been found, however, that many compositions for personal care contain ingredients which may corrode the coating of lacquer. Particularly shaving lotions, such as preshaves and aftershaves, are found to be aggressive relative to the coating of lacquer. The action of said compositions for personal care on the coating of lacquer may lead to corrosion or softening of said coating, so that the protection which the coating of lacquer gives to an underlying material is reduced and the appearance of the coating of lacquer adversely affected.

SUMMARY OF THE INVENTION

It is an object of the invention to provide, inter alia, a utensil for personal care which hardly, or perhaps not at all, demonstrates these undesirable effects. The invention particularly aims at providing a utensil for personal care which, if it is provided with a coating of lacquer, exhibits such a high resistance to a great variety of compositions for personal care, that the appearance of the coating of lacquer is not adversely affected.

This object is achieved by a utensil of the type mentioned in the opening paragraph, which is characterized in accordance with the invention in that the coating of lacquer contains a network of a hydrolytically condensed organosilane compound. The coating of lacquer in accordance with the invention provides the utensil with a very good resistance to a great variety of compositions for personal care. Said coating of lacquer is not subject to softening or corrosion, and, since no ingredients can penetrate the coating of lacquer, the underlying surface is protected.

In experiments and investigations a great variety of compositions for personal care were analyzed and the effect on synthetic resins exposed to these compositions for a prolonged period of time was studied. For the reference material use was made of acrylonitrile butadiene styrene (ABS), but polyurethane lacquers yielded similar results. It has been found that solvents, such as ethanol, do not corrode synthetic resins, but in many cases the so-called emollients do corrode synthetic resins. The corrosion by emollients can be classified as follows. Phospholipids, such as lecithine, and hydrocarbons, such as dioctyl cyclohexane, heptamethyl nonane, paraffin oil, squalene and vaseline cause little or no corrosion or softening. Fatty acids, such as myristic acid, palmitic acid and stearic acid do not cause many problems either. The following emollients are disadvantageous: lanolin and lanolin derivatives, beeswax, alcohols with long carbon chains, such as cetyl alcohol, stearyl alcohol and behenyl alcohol and Guerbet alcohols, such as hexyl decanol and octyl dodecanol. The following compositions, however, are aggressive: triglycerides, both synthetic triglyceride, such as caprylic (i.e. octanoic) and capric (i.e. decanoic) triglyceride, and natural triglyceride, such as almond oil, avocado oil, borage oil, evening primrose oil, macadamia oil, olive oil, sheabutter, sunflower oil, arnica oil, babassu oil, coconut oil, jojoba oil, corn oil, benni oil, st. John's-wort oil and wheat-germ oil. Very aggressive compositions are alkyl-fatty acid esters, such as cetearyl isononanoate, decyl oleate, isopropyl myristate, isopropyl stearate, oleyl oleate, coco-caprilate, hexyl laureate, isopropyl palmitate, myristil lactate, octyl palmitate, oleyl erucate and polyol fatty-acid esters, such as glyceryl laurate, glyceryl monostearate or distearate, propylene glycol dicaprate, di-isopropyladipate and hydrophylic emollients, such as PEG-7 glyceryl cocoate, glyceryl laurate and PPG-5-laureth-5. It has been found, however, that the above-mentioned emollients do not cause corrosion if a synthetic resin part of a utensil for personal care is provided with a coating of lacquer in accordance with the invention.

An additional advantage of the utensils obtained in accordance with the invention is that the coatings of lacquer can be provided in a simple manner from solution by means of customary techniques such as spin-coating, dip-coating or spray-coating. Moreover, processing does not require high temperatures; the processing temperatures are almost always 300° C. or less, while customarily temperatures of 150° C. or less are used, so that not only metal, ceramic or glass surfaces can be provided with said coatings of lacquer, but also synthetic resins such as polyamides, acrylonitrile butadiene styrene (ABS) or polycarbonate. The appearance or other properties of the coating of lacquer can be influenced in a simple manner by adding, for example, dyes, pigments or other fillers, such as silica, zirconium oxide or aluminium oxide, so that a designer of utensils for personal care enjoys great freedom of design.

Coatings of lacquer that contain a network of a hydrolytically condensed organosilane compound are known per se. These materials are also known as materials obtained by means of a sol-gel process or, if they are combined by means of organic polymers, as hybrid or composite materials, heteropolysiloxanes or ormocers. However, these materials are not understood to be siloxanes formed from linear chains or silicone rubbers derived from said siloxanes or other inorganic polymers having a low crosslink density. An organosilane compound or a substituent contained therein is considered to be hydrolytically condensable if the compound contains a silanol group, —Si—OH, or if a silanol group can be formed from said compound by using water, and two silanol groups can react to form an Si—O—Si bond while eliminating water. If these reactions have partially) taken place, then the compound is (partially) hydrolytically condensed. If the organosilane compound comprises three or more hydrolytically condensable substituents, a network can be formed by hydrolytic condensation. If the above-mentioned substituents are linked to one silicon atom, then said silicon atom serves as the crosslink. For further information, reference is made, for example, to a publication by B. M. Novak in Adv. Mat., 5(6), 1993, p. 422, or a publication by H. Schmidt in J. Non-Cryst. Sol. 73, 1985, p. 681 and J. Non-Cryst. Sol. 121, 1990, p. 428.

Suitable hydrolytically condensable organosilane compounds are compounds in accordance with the formula $SiX_pY_qZ_r$, wherein X is a hydrolytically condensable substituent selected, for example, from the group formed by halogen, hydroxy, alkoxy, acyloxy or amino, Y is a polymerizable substituent R—A, wherein R is an alkylene or arylalkylene, possibly interrupted by an oxygen atom or a sulphur atom, or an NH-group, and the substituent A is selected, for example, from the group formed by halogen, amino, amide, aldehyde, alkylcarbonyl, carboxy, thio, cyano, alkoxy, alkoxycarbonyl, sulphonic acid, phosphoric acid, acryloxy, methacryloxy, epoxy or vinyl, and Z is a hydrolytically non-condensable and non-polymerizable substituent which is selected, for example, from the group formed by alkyl and aryl, wherein p is equal to 2, 3, or 4, q is equal to 0, 1 or 2, r is equal to 0 or 1, p+q is greater than 2 and p+q+r is equal to 4. Each time X, Y or Z occurs, it is possible, of course, to make a new choice from the above-mentioned groups. Coatings of lacquer are preferably prepared from mixtures of the above-mentioned organosilane compounds.

In a suitable method of processing said organosilane compounds, an approximately stoichiometric quantity of water is added, so that the hydrolytically condensable substituents are hydrolyzed, thereby forming —Si—OH groups which, while eliminating water, condense to form Si—O—Si bonds. If necessary, said processing step can be carried out in a solvent, and, preferably, an acid, such as hydrochloric acid, or a base, such as caustic soda, is used as a catalyst. Polymerization of the polymerizable substituents by means of radical-polymerization or condensation-polymerization takes place in ways known to those skilled in the art.

A coating of lacquer can be obtained, for example, by partly hydrolytically condensing an organosilane compound at room temperature, thereby forming a sol, which sol is subsequently provided on a substrate by means of, for example, spin-coating, whereafter the hydrolytic condensation is completed by curing the coating of lacquer at an elevated temperature, thereby forming the network.

Although coatings of lacquer which are prepared from organosilane compounds containing four hydrolytically condensable substituents, such as tetraethyl orthosilicate (IEOS), exhibit a good resistance to compositions for personal care, it has been found that, particularly if the coatings of lacquer are thicker than approximately 500 nm, cracks may develop, which adversely affect the appearance. In addition, if the cracks extend throughout the thickness of the layer, no protection is given to the underlying material. The development of cracks can be counteracted by reducing the number of hydrolytically condensable substituents of the organosilicane compound. Consequently, a preferred embodiment of the invention is characterized in that at least one substituent of the organosilane compound is not hydrolytically condensable. In terms of the formula $SiX_pY_qZ_r$, this means that p is chosen to be equal to 2 or 3. Because of the resistance to emollients, p is preferably equal to 3. Suitable organosilane compounds are, for example, alkyl trialkoxysilanes, such as methyl trimethoxysilane, methyl triethoxysilane, ethyl trimethoxysilane, ethyl triethoxysilane. Phenyl trimethoxysilane is suitable too. These organosilane compounds can be used to form coatings of lacquer having a thickness of at least 10 micrometers, and, if desirable, dyes, pigments or other fillers, such as silica particles or soot, may be added to said coatings.

A further preferred embodiment is characterized in accordance with the invention in that the organosilane compound contains an organic, polymerizable substituent.

The use of an organic, polymerizable substituent enables a high crosslinking density to be achieved, without the coating of lacquer exhibiting cracks, so that a very good resistance to emollients is achieved. In terms of the formula $SiX_pY_qZ_r$, in this case, q is equal to 1 or 2. Preferably, q is equal to 1. Suitable organosilane compounds are epoxides, such as 35 glycidoxy propyl trimethoxysilane, by means of which a polyether chain between silicon atoms can be realized, (meth)acrylates, such as methacryloxy propyl trimethoxysilane, or vinyl silanes, such as vinyl trimethoxysilane.

A very advantageous embodiment is characterized in accordance with the invention in that the coating of lacquer contains metal particles. It has been found that it is possible to add metal particles to the sol-gel solution from which the coating of lacquer is manufactured, which particles are embedded in the coating of lacquer. Said particles are preferably plate-shaped with a thickness, for example, of several micrometers and a diameter of fifteen micrometers. The coating of lacquer may contain such a high concentration of metal particles that said coating of lacquer looks like a metal. This is very advantageous, since it enables metal parts of utensils for personal care to be replaced by synthetic resin parts provided with a lacquer coating in accordance with the invention, with a good resistance to emollients present in cosmetic products being obtained or preserved. In principle, all types of metal particles are suitable, yet, preferably, use is made of aluminum particles. Suitable metal particles are to be understood to include in this context pigments by means of which a coating of lacquer can be given a metallic appearance, such as the so-called mother-of-pearl pigments, which are commercially available under the trade name Iriodin, which is a product of Merck. These pigments are so-called interference pigments of mica on which thin layers of titanium oxide and/or iron oxide are deposited.

Utensils for personal care to which the invention can be advantageously applied are toilet articles, such as soap dishes, sprayers and other containers used for storing compositions for personal care, such as cosmetics, (shaving) lotions, shampoos and perfumes. The above-described risk of corrosion becomes more important as the service life of the utensil is longer and/or the purchase price is higher. Therefore, the invention can very advantageously be applied to devices for personal care, such as shavers, epilators, hair trimmers, hair driers, hair curlers, dental care devices. It is very likely that electric shavers will frequently and intensively come into contact with the above-mentioned compositions, as the so-called "preshaves" and "aftershaves" contain relatively aggressive emollients. Preshaves are lotions intended to so condition the skin prior to shaving that a better shaving result is achieved. In general, they contain a relatively large quantity of alkyl fatty-acid esters. Therefore, the invention can very advantageously be applied to electric shavers.

These and other aspects of the invention will be apparent from and elucidated with reference to the embodiments described hereinafter.

BRIEF DESCRIPTION OF THE DRAWINGS

The sole FIGURE shows a utensil for personal care according to the invention, in the form of an electric shaver.

EXAMPLE 1

The sole FIGURE shows a utensil for personal care according to the invention, in the form of an electric shaver 1 whose housing 2 is provided with a coating of lacquer containing a network of a hydrolytically condensed organosilane compound. The housing 2 provided with said coating of lacquer can be manufactured as follows.

A glass-filled polyamide, which is marketed by Bayer under the trade name Durethane, is used to form a housing by means of injection moulding. Subsequently, 11.8 g of the hydrolytically condensable compound 3-glycidoxy propyl trimethoxysilane (Fluke) and 2.7 g water are stirred for 1 hour, thereby forming a sol-gel solution. Next, 3.28 g $Al(O\text{-sec-}Bu)_3$ are mixed with 1.75 g ethyl acetoacetate (Aldrich). The resultant aluminum compound is added to the sol-gel solution, which results in the formation of a clear solution. A quantity of 0.5 g aluminum pigment (Silber Line) is added to said clear solution and dispersed. The resultant lacquer is applied to the housing 2 by means of spraying. After curing for 20 minutes at 80° C., the housing 2 is provided with a coating of lacquer containing a network of a hydrolytically condensed organosilane compound.

By means of the same lacquer, substrates of ABS (Cycolac, General Electric) and polycarbonate (Makrolon, Bayer) are provided with a coating of lacquer by dip-coating and curing for 20 minutes at 80° C.

To determine the resistance to compositions for personal care, such as cosmetics, said coatings of lacquer are exposed to a test solution for two 24-hour periods, which test solution contains several customary, aggressive emollients. A typical test solution comprises an alcoholic solution of 5 to 10 wt. % dilsopropyladipate, 10 to 20 wt. % isopropylmyristate and 0 to 10 wt. % PEG 40 hydrogenated Castor oil.

Visual inspection of said coatings of lacquer revealed that none of said coatings has been subject to corrosion. Said coatings are tested for softening by subjecting them to a pressure which is exerted by a fingernail. This test revealed that none of said coatings of lacquer exhibits softening.

EXAMPLE 2

A quantity of 19.4 g of the hydrolytically condensable compound methyl trimethoxysilane is mixed with 0.9 g of the also hydrolytically condensable compound tetraethyl orthosilicate (TEOS) and with 2.9 g acetic acid and 20 g of an aqueous suspension of silica particles (50 wt. %), which is commercially available under the trade name Ludox 50 (supplier DuPont de Nemours). The mixture is stirred at room temperature and a sol-gel solution is formed by partial hydrolytic condensation. The sol-gel solution is applied to an aluminum plate by spin-coating for 120 s at 400 rpm. Subsequently, the layer is subjected to a further hydrolytic condensation process in a furnace for 45 minutes at 300° C., thereby forming a coating of lacquer containing a network of a hydrolytically condensed organosilane compound. The resultant coating of lacquer has a thickness of 8 micrometers.

To test the resistance to compositions for personal care, the coating of lacquer is subjected to the same resistance tests as described in example 1. These tests reveal that corrosion or softening of the coating of lacquer does not take place.

EXAMPLE 3

A quantity of 10 g TEOS, 80 g ethanol and 10 g acified water (1N HCl) are mixed and stirred for 1 hour, so that partial hydrolytic condensation takes place. The sol-gel solution thus prepared is spin-coated onto a stainless-steel substrate at 600 rpm, which substrate has been cleaned previously by an ultrasonic treatment in a soap solution followed by an UV/ozone treatment. A coating of lacquer containing a network of a hydrolytically condensed organosilane compound is obtained after hydrolytic condensation for 30 minutes at 300° C. The resultant coating of lacquer has a thickness of 200 nanometers and does not exhibit cracks. The coating of lacquer is not corroded if it is subjected to the resistance tests described in example 1.

COMPARATIVE EXAMPLE

An ABS substrate (Cycolac, General Electric), a polycarbonate substrate Makrolon, Bayer) and a polyamide substrate (Durethane, Bayer) are coated with a known isocyanate lacquer by dip-coating and cured in a furnace for 20 minutes at 80° C., thereby forming an isocyanate coating of lacquer. The known isocyanate lacquer contains an acrylate polymer which has been functionalized by means of vinylacetate hydroxy and to which a diisocyanate is added as a curing agent.

Subsequently, the isocyanate coatings of lacquer are subjected to the resistance tests described in example 1. Already after 24 hours said isocyanate coatings of lacquer become detached from the substrate and exhibit a high degree of softening.

A polyamide substrate, which is provided with an isocyanate coating of lacquer in a corresponding manner, yet is cured at 150° C., exhibits a slight degree of softening after 24 hours. After a second period of 24 hours, however, this coating of lacquer exhibits a strong degree of softening and can be easily removed by means of a fingernail.

I claim:

1. A utensil for personal care, which is provided with a coating of lacquer having improved resistance to emollients, wherein said coating of lacquer contains a network of a hydrolytically condensed organosilane compound.

2. A utensil for personal care, as claimed in claim 1, wherein at least one substituent of the organosilane compound is not hydrolytically condensable.

3. A utensil for personal care, as claimed in claim 1, wherein the organosilane compound contains an organic, polymerizable substituent.

4. A utensil for personal care, as claimed in claim 1, wherein the coating of lacquer contains metal particles.

5. A utensil for personal care, as claimed in claim 4, wherein the metal particles contain aluminium.

6. A utensil for personal care, as claimed in claim 1, wherein the utensil is an electric shaver.

7. A utensil for personal care, which is provided with a coating of lacquer having improved resistance to emollients, wherein said coating of lacquer contains a network of a hydrolytically condensed organosilane compound having the formula $SiX_pY_qZ_r$, wherein X is a hydrolytically condensable substituent selected from the group consisting of halogen, hydroxy, alkoxy, acyloxy, and amino groups; Y is a polymerizable substituent R—A, wherein R is an alkylene or arylalkylene radical, and alkylene or arylalkylene radical interrupted by an oxygen atom, or a sulphur atom, or an NH-group, and the substituent A is selected from the group consisting of halogen, amino, amide, aldehyde, alkylcarbonyl, carboxy, thio, cyano, alkoxy, alkoxycarbonyl, sulphonic acid, phosphoric acid, acryloxy, methacryloxy, epoxy and vinyl; and Z is a hydrolytically non-condensable and non-polymerizable substituent which is selected from the group consisting of alkyl and aryl, wherein p is equal to 2, 3 or 4, q is equal to 0, 1 or 2, r is equal to 0 or 1, p+q is greater than 2 and p+q+r is equal to 4.

* * * * *